United States Patent [19]
Beuster et al.

[11] Patent Number: 5,895,886
[45] Date of Patent: Apr. 20, 1999

[54] SUPPLY UNIT

[75] Inventors: Helmut Beuster, Lübeck; Rudolf Greiff, Badendorf; Georg Schlör; Bernd Schlichting, both of Lübeck; Dirk Lenz, Hamburg, all of Germany

[73] Assignee: Drägerwerk Aktiengesellschaft, Lübeck, Germany

[21] Appl. No.: 08/604,863

[22] Filed: Feb. 22, 1996

[30] Foreign Application Priority Data

Apr. 20, 1995 [DE] Germany ............... 195 14 590

[51] Int. Cl.⁶ ............................................. H02G 3/04
[52] U.S. Cl. ........................................................ 174/48
[58] Field of Search ............... 174/48, 49; 52/36.4, 52/36, 28, 220.7, 220.8

[56] References Cited

U.S. PATENT DOCUMENTS

| | | | |
|---|---|---|---|
| 4,646,211 | 2/1987 | Gallant et al. | 362/149 |
| 4,874,322 | 10/1989 | Dola et al. | 439/210 |
| 5,060,425 | 10/1991 | Kappers et al. | 52/36 |

FOREIGN PATENT DOCUMENTS

| | | | |
|---|---|---|---|
| 0242568 | 12/1881 | European Pat. Off. . | |
| 0 242 568 B1 | 3/1987 | Germany | H02B 1/04 |
| 64-20827 | 2/1989 | Japan . | |

Primary Examiner—Kristine L. Kincaid
Assistant Examiner—Joseph Waks
Attorney, Agent, or Firm—McGlew & Tuttle

[57] ABSTRACT

A supply unit for supplying a workplace with electricity and/or gaseous media, with a first, vertically extending supply duct and a second, vertically extending supply duct, wherein the electricity and the media are led to connections on at least one of the supply ducts. From these connections the workplace is supplied and improved such that the ergonomically most favorable arrangement of the supply tubes and electric lines leading to the connections will be possible. This object is accomplished by a section of the side surfaces having an angle of inclination less than 90° in relation to the base such that the ends of the side surfaces pointing away from the base can be connected at a common junction. The connections are arranged exclusively on the outer side surfaces and that the distance between the supply ducts is such that the workplace can be brought into the space between the supply ducts.

15 Claims, 4 Drawing Sheets

SUPPLY UNIT

FIELD OF THE INVENTION

The present invention pertains to a supply unit for opposite sides of a workplace, and in particular where the workplace includes a bed, such as in a hospital, where tubing and cabling connections need to be easily accessible by staff personnel, but should not be directly viewable by the patient.

BACKGROUND OF THE INVENTION

A supply unit for gaseous and liquid media as well as electricity has become known from EP 0 242 568 B1. Column-like supply ducts, on which connections for tapping electricity and gaseous media are arranged, are provided behind a workplace plane formed by positioning elements. The supply ducts are led to the floor and are anchored there. Such supply ducts are used for laboratory applications, in which adjustments to different tasks are frequently made and different gas and electricity connections must be present in sufficient numbers.

Besides laboratory workplaces, media-carrying supply units have been known at medical workplaces as well. However, other criteria must also be taken into account there, besides the flexibility of the connection possibilities of various devices, e.g., respirators and monitors. For example, the patient shall be hindered by gas supply tubes and electric lines as little as possible, and connections should be arranged outside the immediate field of vision of the patient.

Rail-like connection means, which extend on the wall horizontally above the patient's bed and contain connections for medical gases, vacuum, and electricity, have been known to exist at medical workplaces. The disadvantage of such connection means is the fact that an orderly cable routing to the medical devices is difficult to achieve, and that many of the supply lines are located in the patient's field of vision. If some devices must be replaced with others, or new devices must be placed at the workplace, the corresponding connector plugs are plugged into corresponding couplings or electric outlets, usually above the patient.

SUMMARY AND OBJECTS OF THE INVENTION

The basic object of the present invention is to improve a supply unit of this class such that the patient is inconvenienced by the cable routing as little as possible, and that the supply tubes and electric lines can be changed in an ergonomically favorable position.

The advantage of the present invention is essentially the fact that the media connections are attached to vertical supply ducts which are arranged on either side of the workplace. The media connections are on the outer side parts of the supply ducts which point away from the workplace. As a result, a pleasant environment is created for the patient, because the media connections are located outside his immediate field of vision, and, in addition, handling is easy for the operating personnel, because all connections can be operated from the outer side surfaces. In addition, a defined separation of the clean side, i.e., the patient side, from the unclean side, i.e., the device side, is achieved due to the supply unit according to the present invention.

The bases and the side surfaces of the supply ducts are preferably arranged in the shape of a triangle in relation to one another.

The bases of the supply ducts are preferably directly fastened to a wall. Supply lines extending in the wall can thus be led out of the wall and into the interior space of the supply ducts and from there to the connections on the outer side surfaces. The supply lines can be slid from the wall into the supply ducts in a particularly simple manner if the bases are interrupted section by section.

The outer side surfaces are preferably essentially flat, and the inner side surfaces have an essentially convex body shape. The media-carrying connections can be mounted in an especially simple manner on the flat outer side surfaces, and the convexly arched inner side surfaces create a pleasant visible surface for the patient.

A tubular support extending along the supply ducts is preferably provided in the area of the junction of the outer side surface and the inner side surface. Medical apparatus, e.g., infusion pumps, can be directly attached to these tubular supports.

Height-adjustable brackets carrying the apparatus are preferably provided on the supports. Medical apparatus, which are supplied via the media connections on the outer side surfaces, may be placed on the brackets.

The brackets are preferably designed as brackets pivotable around the support.

A tubular mount extending between the supply ducts is advantageously provided for accommodating lighting fixtures. It is especially advantageous to design the mount as an extension of the supports at the supply ducts.

A comb-shaped cable and tube holder, which extends in the vertical direction along the supply ducts and is used to fix the gas supply tubes and electrical lines leading to the connections, is advantageously arranged in the area of the outer side surface and/or the junction of the outer and inner side surfaces.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

One exemplary embodiment of the present invention is shown in the drawing and will be explained in greater detail below.

In the drawing,

FIG. 1 is a top view of a supply unit;

FIG. 2 is a side view in viewing direction II according to FIG. 1;

FIG. 3 is a cross section through a supply duct;

FIG. 4 is a detail B of FIG. 3 in the viewing direction IV.

DETAILED DESCRIPTION OF THE PREFERRED EMBODIMENT

Figure 1:
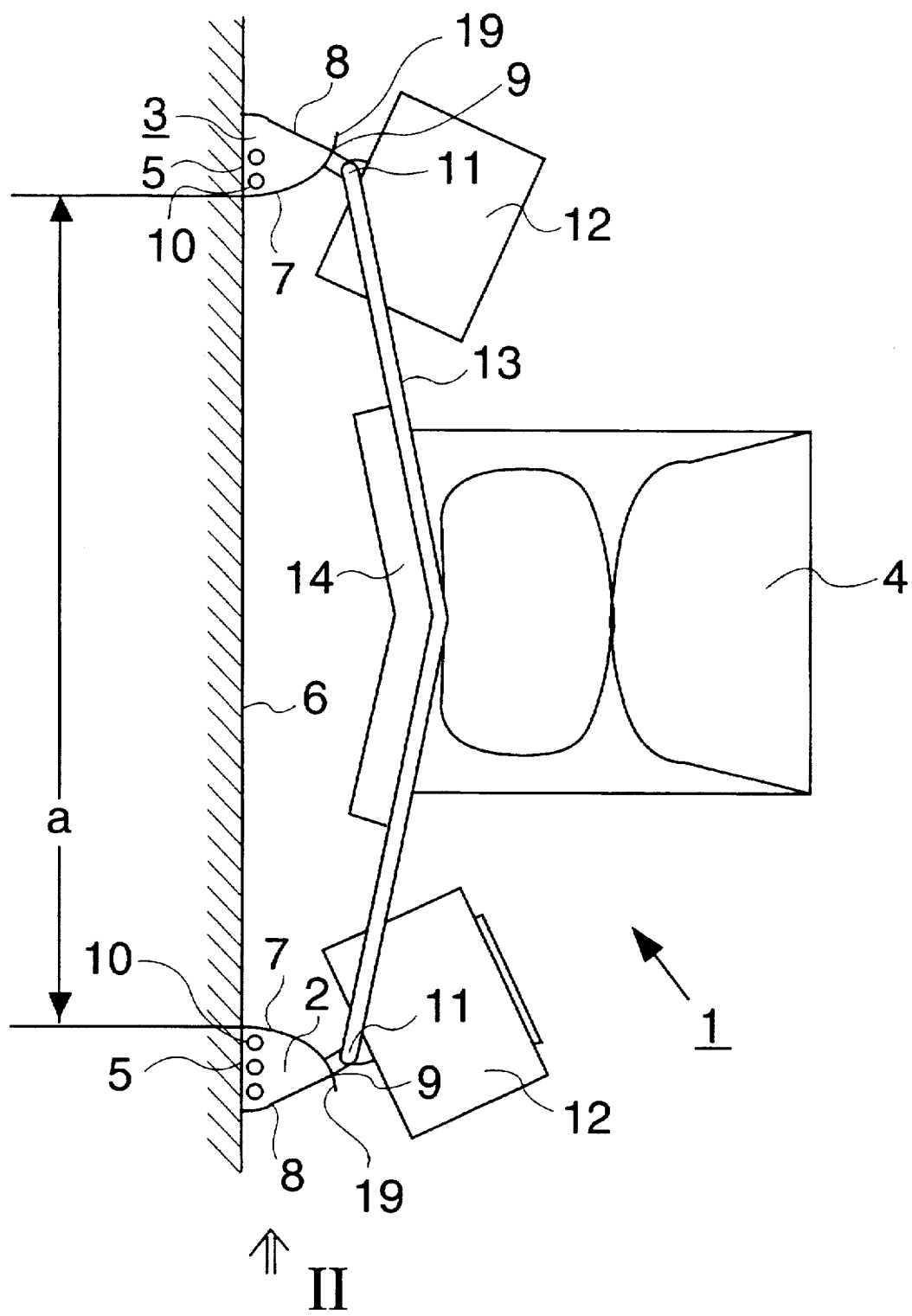

Referring to the drawings, and in particular the top view of a supply unit 1 as shown in FIG. 1, a first supply duct 2 and a second supply duct 3 are provided on both sides of a bed 4 which can be considered as a workplace. Each of the supply ducts 2, 3 has a base 5 which is arranged directly on a wall 6, a convexly arched inner side surface 7, and an essentially or substantially flat outer side surface 8. The side surfaces 7, 8 are connected to one another at a junction 9. Supply lines 10 for electricity and gaseous media, which lead to connections (not shown in FIG. 1) located in the outer side surfaces 8, extend within the supply ducts 2, 3. A support 11 for indirectly supporting workplace apparatus and for pivotably fastening brackets 12 on which medical apparatus can be placed, extends in the area of the junction 9 along the supply ducts 2, 3, i.e., at right angles to the plane of the drawing of FIG. 1. The medical apparatus are not shown in FIG. 1. The supports 11 are continued above the bed 4 in a tubular mount 13, to which a lighting fixture is fastened. The mount 13 is bent in the direction of the bed 4. The supply ducts 2, 3 are fastened to the wall 6 at a distance a such that the bed 4 can be pushed in between the supply ducts 2, 3.

Figure 2:
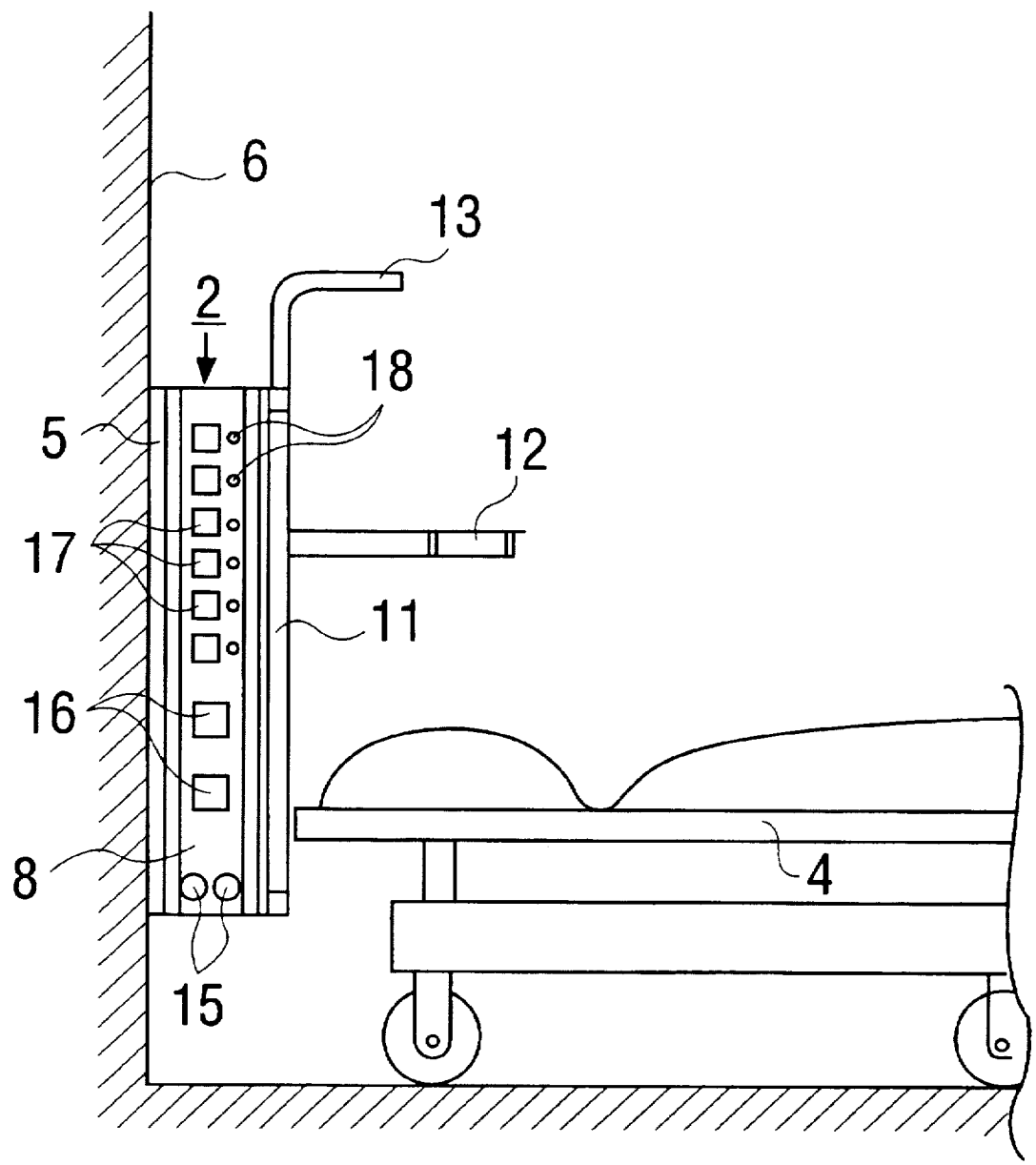

FIG. 2 is a side view of the outer side surface 8 of the first supply duct 2 in viewing direction II according to FIG. 1. Identical components are designated by the same reference numbers as in FIG. 1. To supply the medical apparatus, not shown, which may be arranged either on one of the brackets 12 or next to the bed 4, there are provided on the outer side surfaces 8 gas outlets 15 for compressed gas and vacuum, monitor connections 16, and electric outlets 17 with equipotential pins 18. The gas supply tubes and electric lines (not shown in the figure), laterally depart from the connections 15, 16, 17, 18 and are led directly to the apparatus located on the brackets 12 or standing next to the bed. Thus they are outside the patient's field of vision. If supply tubes or electric lines must be replaced, they are simply pulled out of the connections 15, 16, 17, 18, without hereby inconveniencing the patient.

Figure 3:
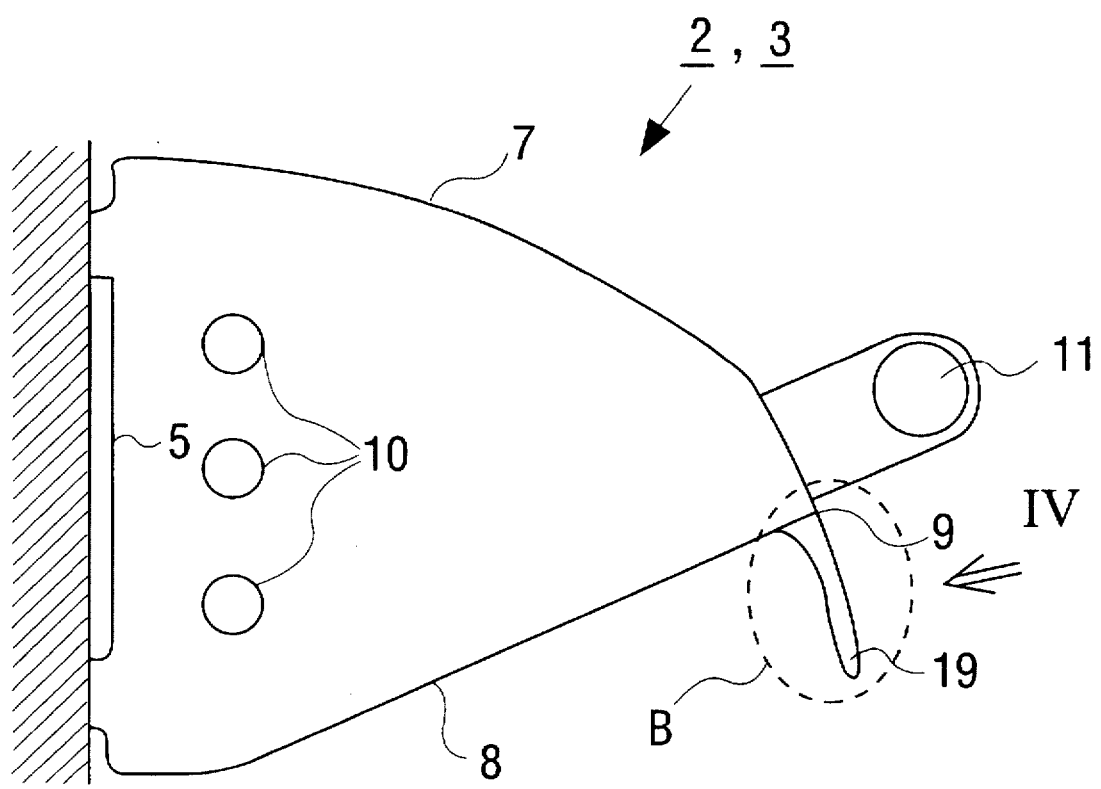

FIG. 3 shows a cross section through one of the supply ducts 2, 3. Identical components are designated by the same reference numbers as in FIGS. 1 and 2. As is apparent from FIG. 3, the supply ducts 2, 3 can be prepared from sectional elements in a particularly simple manner.

Figure 4:
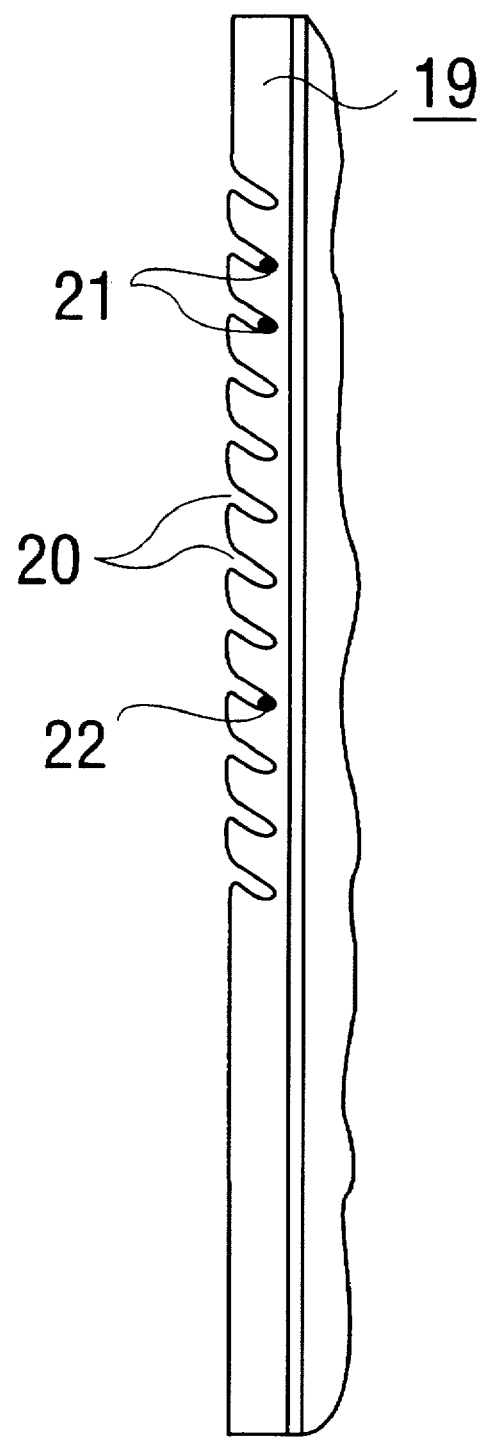

FIG. 4 shows a detail section B of FIG. 3, which shows a comb-like cable and tube holder 19 with individual grooves 20 extending in parallel to one another. The cable and tube holder 19 is for fixing gas supply connections 21 and electric lines 22, which extend from the medical apparatus and are not shown in the figures, to the connections 15, 16, 17, 18. An especially clear line routing is achieved with the tube holder 19. In FIG. 3, the cable and tube holder 19 extends in parallel to the support 11.

While specific embodiments of the invention have been shown and described in detail to illustrate the application of the principles of the invention, it will be understood that the invention may be embodied otherwise without departing from such principles.

What is claimed is:

1. A supply unit for supplying a workplace, the supply unit comprising:

a first supply duct;

a second supply duct spaced from said first supply duct by a distance greater than the workplace, each of said supply ducts having a base, a first side surface and a second side surface, said first and second side surfaces project from a spaced locations on a respective said base, said first and second side surfaces of each of said supply ducts join each other at a junction spaced from said base, said first side surfaces of said supply ducts being positioned to substantially face each other, said second side surfaces of said supply ducts being positioned to substantially face away from each other;

a plurality of supply lines positioned in at least one of said supply ducts;

a plurality of connector means connected to said supply ducts for supplying the workplace, said plurality of connector means being exclusively positioned on said second side surface of said at least one supply duct;

a tubular support means for supporting a workplace apparatus is positioned at said junction of each of said supply ducts, said tubular support means extending along a length of said junction.

2. A supply unit in accordance with claim 1, wherein:

said first and second supply ducts extend vertically;

said first and second side surfaces project from said respective base;

one of said first and second side surfaces of each of said first and second supply ducts has an angle of inclination less than 90° in relation to said respective base to cause said side surfaces of said each of said first and second supply ducts to point away from said respective base.

3. A supply unit in accordance with claim 1, wherein:

said base, and said first and second side surfaces of each of said first and second supply ducts are arranged in a shape of a triangle.

4. A supply unit in accordance with claim 1, wherein:

said bases are fastenable to a wall.

5. A supply unit in accordance with claim 1, wherein:

said second side surfaces are substantially flat and said first side surfaces are convexly arched.

6. A supply unit in accordance with claim 1, further comprising:

bracket means adjustably positionable on said support means for providing a support surface for the workplace apparatus.

7. A supply unit in accordance with claim 6, wherein:

said bracket means has means for pivoting around said support means.

8. A supply unit in accordance with claim 1, wherein:

light mounting means extending between said first and second supply ducts, said light mounting means providing a mount for a lighting fixture;

said light mounting means is an extension of said support means.

9. A supply unit in accordance with claim 1, wherein:

said light mounting means extends from one of said first and second supply ducts toward the workplace.

10. A supply unit in accordance with claim 1, wherein:

said first and second supply ducts are positionable on a wall and on opposite sides of a head of a bed positioned in the workplace, said second side surfaces of said supply ducts being arranged to be substantially out of view of a patient in the bed and accessible to persons located on sides of the bed.

11. A supply unit in accordance with claim 1, wherein:

said first and second supply ducts extend from below a top surface of the workplace to above the top surface of the workplace.

12. A supply unit for supplying a workplace, the supply unit comprising:

a first supply duct;

a second supply duct spaced from said first supply duct by a distance greater than the workplace, each of said supply ducts having a base, a first side surface and a second side surface, said first and second side surfaces project from a spaced locations on a respective said base, said first and second side surfaces of each of said supply ducts join each other at a junction spaced from said base, said first side surfaces of said supply ducts being positioned to substantially face each other, said second side surfaces of said supply ducts being positioned to substantially face away from each other;

a plurality of supply lines positioned in at least one of said supply ducts;

a plurality of connector means connected to said supply ducts for supplying the workplace, said plurality of connector means being exclusively positioned on said second side surface of said at least one supply duct;

a light mounting means extending between said first and second supply ducts, said light mounting means providing a mount for a lighting fixture.

13. A supply unit in accordance with claim 12, wherein:

said first side surfaces of said supply ducts are clear of said connector means;

both of said first and second supply ducts include said supply lines;

said supply ducts are positioned on opposite sides of the workplace;

said light mounting means positions the lighting fixture to illuminate the workplace.

14. A supply unit in accordance with claim 12, wherein:

no said connector means are provided on said first side surface of said first and second supply ducts;

both of said first and second supply ducts include said supply lines;

said supply ducts arc positioned on opposite sides of the workplace;

said light mounting means positions the lighting fixture to illuminate the workplace.

15. A supply unit for supplying a workplace, the supply unit comprising:

a first supply duct;

a second supply duct spaced from said first supply duct by a distance greater than the workplace, each of said supply ducts having a base, a first side surface and a second side surface, said first and second side surfaces project from a spaced locations on a respective said base, said first and second side surfaces of each of said supply ducts join each other at a junction spaced from said base, said first side surfaces of said supply ducts being positioned to substantially face each other, said second side surfaces of said supply duct being positioned to substantially face away from each other;

a plurality of supply lines positioned in at least one of said supply ducts;

a plurality of connector means connected to said supply ducts for supplying the workplace, said plurality of connector means being exclusively positioned on said second side surface of said at least one supply duct;

holder means for holding cables and tubes from said plurality of connector means, said holder means being positioned adjacent one of said junction and said second side surface of one of said supply ducts, said holder means having a comb-shape.

* * * * *